United States Patent [19]
Malchert, Sr.

[11] Patent Number: 4,524,537
[45] Date of Patent: Jun. 25, 1985

[54] BARBLESS FISHHOOK

[76] Inventor: Arthur F. Malchert, Sr., 2030 S. 1st Ave., Maywood, Ill. 60153

[21] Appl. No.: 523,603

[22] Filed: Aug. 16, 1983

Related U.S. Application Data

[63] Continuation-in-part of Ser. No. 495,919, May 23, 1983, abandoned, which is a continuation of Ser. No. 267,351, May 26, 1981, abandoned, which is a continuation-in-part of Ser. No. 178,838, Aug. 18, 1980, abandoned, which is a continuation-in-part of Ser. No. 92,211, Nov. 7, 1979, abandoned.

[51] Int. Cl.³ .............................................. A01K 83/02
[52] U.S. Cl. .............................................. 43/36; 43/37
[58] Field of Search .............. 43/34, 36, 37; 299/150, 299/104, 28, 11, 13, 106, 66 R, 110 A, 110.1, 16

[56] References Cited

U.S. PATENT DOCUMENTS

| | | | |
|---|---|---|---|
| 503,864 | 8/1893 | Lehmann | 43/37 |
| 2,350,650 | 6/1944 | Titus | 43/37 |
| 2,632,275 | 3/1953 | Richardson | 43/37 |
| 2,881,550 | 4/1959 | Newkirk | 43/44.6 |
| 4,005,843 | 2/1977 | Tash | 294/28 |

Primary Examiner—Nicholas P. Godici
Assistant Examiner—C. McKee
Attorney, Agent, or Firm—Leydig, Voit, Osann, Mayer and Holt, Ltd.

[57] ABSTRACT

A barbless fishhook is made of two pieces of bent wire together with a leader joining looped ends of the wire in a tong-like action to engage the fish's mouth and to be removable therefrom without tearing the mouth.

2 Claims, 5 Drawing Figures

U.S. Patent  Jun. 25, 1985  4,524,537

BARBLESS FISHHOOK

TECHNICAL FIELD

This is a continuation-in-part of Ser. No. 495,919 filed May 23, 1983 which is a continuation of Ser. No. 267,351 filed May 26, 1981 which is a continuation-in-part of Ser. No. 178,838, filed Aug. 18, 1980, which in turn is a continuation-in-part of Ser. No. 092,211, filed Nov. 7, 1979 all of which are abandoned. The disclosures of those applications are incorporated by reference herein.

BACKGROUND ART

This invention relates to barbless fishhooks, and more particularly provides an environmentally acceptable, springless, barbless fishhook. More particularly, it provides a reversible, springless, barbless fishhook made of two bent wires and a leader, which does not tear the mouth of the fish after the hook is withdrawn, either deliberately by the fisherman or accidentally by the fish.

Fishing is one of the worlds enjoyable sports. Years of research, development, and design have gone into providing the fisherman with equipment for effectively catching his or her prey.

Notwithstanding these endeavors, fishhooks in common use today differ only insignificantly from those used decades ago. The fishook is generally a length of wire bent into a crock or hook portion, provided at one end with a sharp point and a sharp barb, and at the opposite end a leader-receiving eye.

Environmentalists have long protested that the conventional barbed fishhook causes debilitating, and often fatal, injury to the fish in the event the fish is able to tear loose of the hook, or if the fisherman cuts the fish loose intending to return it to the water. Alternative remedies have been suggested, but without success. On the one hand, barbless fishhooks have been proposed, but these tend to be complicated (e.g., Jacobs U.S. Pat. No. 1,217,769; Dawson U.S. Pat. No. 2,810,230; Richardson U.S. Pat. No. 2,632,275).

More secure fishhooks, which rely on springloaded traps, are presently illegal (e.g., Neal U.S. Pat. No. 3,803,748). Also, providing more secure fishhooks, which reduce the chance of a fish tearing loose, does not solve the problem of a fisherman's voluntarily disengaging a fish for return to the water (e.g., Lehmann U.S. Pat. No. 503,864; DeForest U.S. Pat. No. 264,256).

Accordingly, an object of the invention is to provide an environmentally acceptable, springless, barbless fishhook. A further object is to provide a reversible fishhook that can be used for trolling, spinning, casting, and in conjunction with plug fishing. Other and further objects and advantages of the invention will become apparent as the description proceeds.

DISCLOSURE OF THE INVENTION

Briefly, in accordance with the invention, an environmentally acceptable, reversible, springless and barbless, fishhook is provided which is composed of a pair of generally similar wire hook halves, pivoted together, with a leader connecting adjacent ends of the hooks so that tension applied to the hook by a biting fish urges the hook halves either together or apart, depending upon the initial setting of the hook.

In more detail, each hook half is formed of a single length of wire bent into shape. The wire comprises a generally straight center shank portion, a barbless crock or hook portion at one end of the straight shank portion, a pivot coil or loop at the opposite end of the shank portion, and an offset upper portion extending from the loop and terminating in a leader-receiving eye. A pivot pin joins the hook halves together at the coil or loop, thereby permitting tong-like movement of the hook halves with respect to each other. A leader extends through both of the eyes, and is tied to form a fixed bight. Thus, as a fish applies tension to the hook, the hook halves move either inwardly or outwardly, depending on the initial setting of the hook, to either close or open, respectively, the halves and thereby secure the fish.

Should the fish throw the hook, or should the fisherman wish to disengage the hook and return the fish to the water, there are no barbs which would otherwise tear the fish's mouth, gills, or other body parts.

BRIEF DESCRIPTION OF THE DRAWINGS

The invention will be more fully described in conjunction with the appended drawings wherein.

BEST MODES FOR CARRYING OUT THE INVENTION

Figure 1:
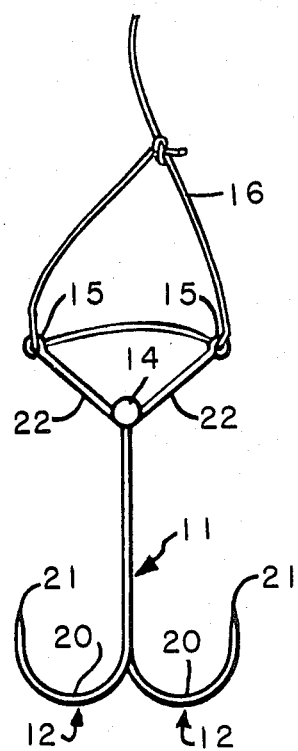
FIG. 1 is a side view of the reversible springless and barbless fishhook in the plug position, most useful when fishing in weeded areas.

As shown in FIG. 1, the fishhook of the invention 11 comprises two generally similar wire hook halves 12 (FIG. 3), each half formed of a single length of wire. The halves are joined as at pivot 14, and terminate in a pair of leader-receiving eyes 15. A leader extends through both of the eyes 15, so that when tension is applied to the hook 11 by a fish attempting to remove bait (not shown) affixed to the hook, the leader 16 urges the eyes 15 together, thereby (in the configuration of FIG. 1) spreading the hook portions 12 apart, and expanding the hook in the mouth of the fish.

Figure 3:
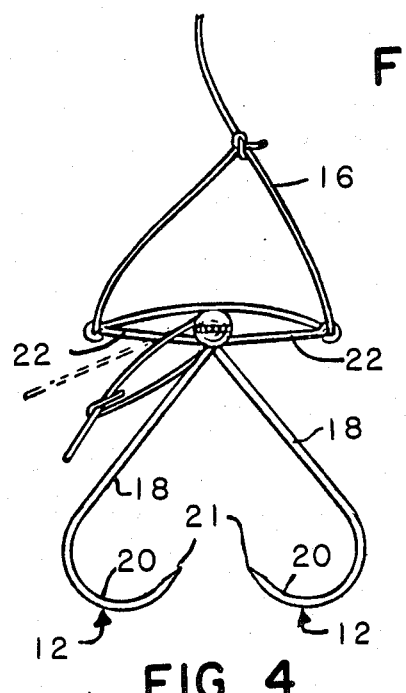
FIG. 3 is a single hook half.

Each hook half 12 is, as shown in FIG. 3, composed of a generally straight center shank portion 18, with a single coil or loop 19 at the top end and a barbless crock or hook portion 20 at the opposite end. The hook portion 20 terminates in a sharp point 21 and, as noted previously, there is no barb associated with the point 21 to tear the mouth of the fish.

Adjacent the coil or loop 19, and extending approximately in the same plane as the hook portion 20, is an offset upper portion 22, which is a continuation of the coil or loop 19. The offset upper portion 22 terminates in a leader-receiving eye 15, which is merely one or more coils of wire having or forming a passageway for a relatively movable leader of fishline, monofilament, or the like, attached to the main line. The leader 16 is shown in FIG. 1, and is simply a knotted loop extending through both of the eyes 15.

As also shown in FIG. 3, the offset upper portion 22 of the hook half 12 is offset, in approximately the plane of the hook portion 20, and toward the hook portion 20, by an angle "a" that is quite important to the successful functioning of the fishhook of the invention. For best results, this angle "(a)" should be approximately 45, give or take about 15. With such and angle, tension applied to the hook by a biting fish will urge the hook halves 12 (FIG. 1) outward, into a secure engagement with opposed portions of a fish's mouth, making inadvertent removal impossible, or virtually so, but making deliberate removal by a fisherman quite easy simply by expanding the upper portions 22, and pressing the hook 11 toward the fish.

Figure 2:
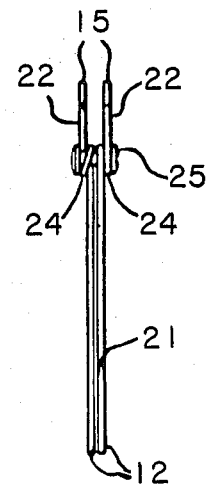
FIG. 2 is a side view of the hook shown in FIG. 1.
Figure 5:
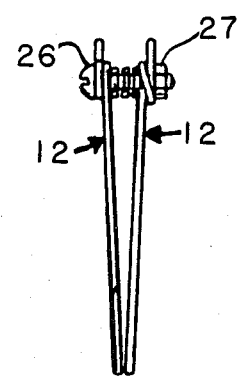
FIG. 5 is a side view of the fishhook shown in FIG. 4 and illustrates the preferred arrangement of a coil spring associated with the bolt and nut pivot pin.

As shown best in FIG. 2, the pivot 14 which permits the two hook halves 12 to move in response to a fish pulling on the hook comprises merely a single coil or loop 24 of the wire constituting each hook half 12. Through the opening in these loops 24 is inserted a pin-like rivet 25, or an alternative rivet-like nut 26 and bolt 27 as shown in FIG. 5 should tension adjustment be desirable which provides a sole means for holding said hook halves with controlled tension. If required, particularly in larger size hooks, one or more spring washers 20 or a coil spring 28 (FIG. 5) may be inserted between the hook halves 12, and/or between each hook half 12 and the end of the rivets 25 which, in combination with the adjustment of the spring by the nut 26 and bolt 27, permits adjustment of the friction force holding the hook halves 12 in the relationship either splayed inwardly or outwardly which the fisherman desires, while the hook is being pulled through the water.

Figure 4:
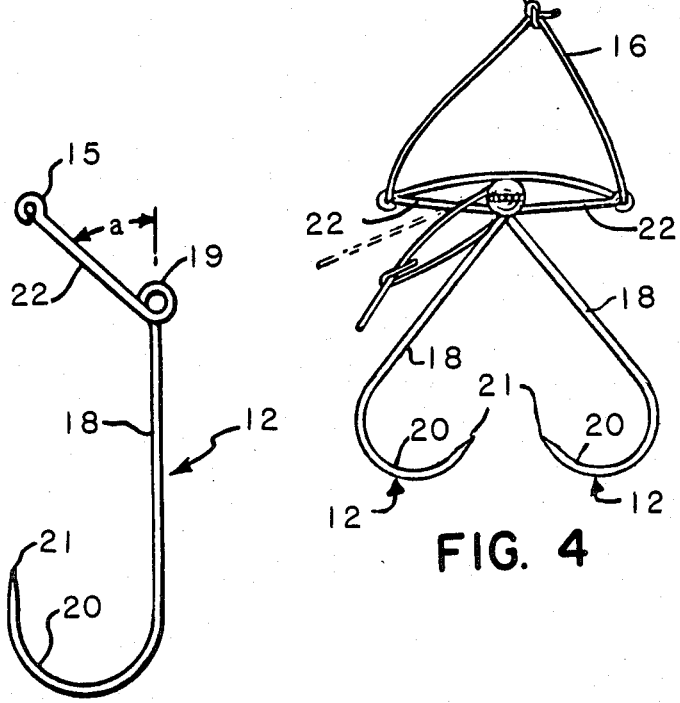
FIG. 4 is a side view of the reversible springless and barbless fishhook in the reversed position and includes a minnow harness.

The hook of the invention may be utilized in either of two positions. First, as shown in FIG. 1, the hook halves 12 are splayed outward, and a piece of bait (not shown) is affixed to either or both hooks 20. This position has been found to be most advantageous when used in plug fishing, as it avoids weeds. A minnow harness 30 may also be included as shown in FIG. 4.

Alternatively, the hook may be reversed (i.e., by moving the hook halves outwardly so that the points 21 point toward each other) and the hook portions 20 in such case are intially splayed inwardly as shown in FIG. 4, with bait, again, affixed to either or both hooks. For this purpose, the hook halves are arranged in parallel planes so that the center shank portions can pass each other during the reversing of the hook. In this latter case, the hook halves 12 move inwardly when the fish bites the bait, thereby seizing the fish by a pincer-like movement, with one point 21 affixing itself to the inside of the fish's mouth, while the opposite point 21 secures the outside of the lip.

In either position, it is apparent that the more the fish pulls, the tighter the hook seizes the fish. If the hook is positioned to move outward, the hook engages opposite portions of the fish's mouth. If the hook, on the other hand, is set to move inward, the points 21 pinch the fish's mouth. In either case, inadvertent removal by the fish is difficult if not impossible, yet deliberate removal by the fisherman is facilitated since there are no barbs to contend with.

Thus, it is apparent that the invention satisfies the objects set forth above. While the invention has been described in conjunction with specific embodiments, it is manifest that various alternative, modifications, and variations will be apparent to those skilled in the art in light of the foregoing description. Accordingly, it is intended to embrace these within the spirit and scope of the appended claims.

Moreover, it will be apparent that the hook may vary in the size depending on the likely prey, with smaller hooks being usable for small fish, and larger ones for gamefish. Also, while ordinary spring wire or coated spring wire will suffice in the usual case, any metallic wire is satisfactory.

I claim:

1. A reversible, springless, barbless fishhook comprising:
(A.) a pair of generally similar wire hook halves, each half being formed of a single length of wire bent into:
  (i) a generally straight center shank portion;
  (ii) a barbless hook portion at one end of said generally straight center shank portion;
  (iii) a first loop at the opposite end of said straight portion; and
  (iv) an offset upper portion, offset at an angle between about 30 degrees and 50 degrees toward and generally in the plane of said hook portion and said center shank portion, extending from said loop and terminating in a leader-receiving eye portion,
(B.) means for allowing center shank portions of said hook halves to pass each other upon tong-like movement of said hook halves comprising: a pivot pin including means for adjusting tension joining said hook halves at the loops and said hook halves being in parallel planes, said pivot pin providing a sole means for holding said hook halves with controlled tension while permitting tong-like movement of both said hook halves toward each other from an initial position with the hook portions splayed inwardly or away from each other from an initial position with the hook portions splayed outwardly, and
(C.) a leader extending movably through both said leader-receiving eyes, said leader forming a fixed bight, so that tension applied to a hook by a fish urges said offset upper portions together, and either moves said barbless fishhook portions apart when the hook portions are initially splayed outwardly and baited or moves said barbless hook portions together when the hook portions are initially splayed inwardly and baited.

2. A fishhook as set forth in claim 1 wherein said means for adjusting tension comprises a coil spring between said hook halves which applies a controlled friction force holding the hook halves in a pre-set initial position relative to each other while the fishhook is pulled through the water.

* * * * *